United States Patent [19]
Mauron

[11] 3,806,186
[45] Apr. 23, 1974

[54] SLIDING ROOF

[75] Inventor: Gerard Mauron, Versailles, France

[73] Assignees: Automobiles Peugeot, Paris; Regie Nationale Des Usines Renault, Billancourt, both of, France

[22] Filed: Mar. 21, 1972

[21] Appl. No.: 236,406

[30] Foreign Application Priority Data
Apr. 26, 1971 France .............................. 71.14799

[52] U.S. Cl. .......................... 296/137 G, 296/137 H
[51] Int. Cl. ................................................ B60j 7/10
[58] Field of Search ......... 296/137 H, 137 G, 137 E

[56] References Cited
UNITED STATES PATENTS
3,610,682  10/1971  Vermeulen ..................... 296/137 H
FOREIGN PATENTS OR APPLICATIONS
1,148,889  3/1959  Germany ....................... 296/137 G Primary Examiner—Robert R. Song
Attorney, Agent, or Firm—Burns, Doane, Swecker & Mathis

[57] ABSTRACT

Openable roof of a vehicle comprising a fixed part and a slidable panel. Shifting means for sliding the panel in a given direction are provided and locking means lock the panel in any desired position. The locking means comprise a toothed member having an axis parallel to said given direction and axially fixed relative to the fixed part, and two jaws carried by the panel and movable transversely of said given direction, resiliently yieldable return means for biasing said jaws into engagement with the toothed member, and manual control means for shifting apart the jaws and disengaging them from the toothed member. The toothed member may be in the form of a rotatable screwthreaded rod which co-operates with screw threads on the jaws and forms part of other panel shifting means.

13 Claims, 8 Drawing Figures

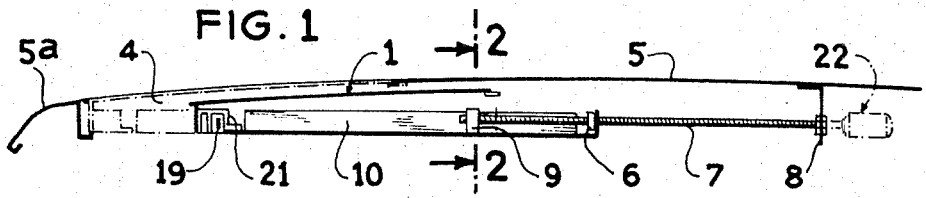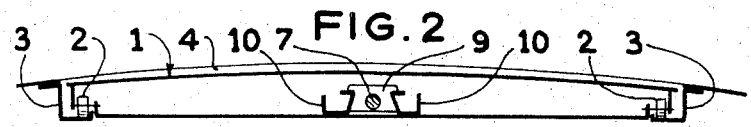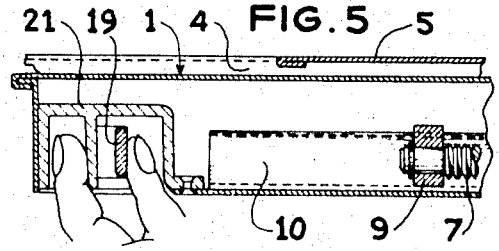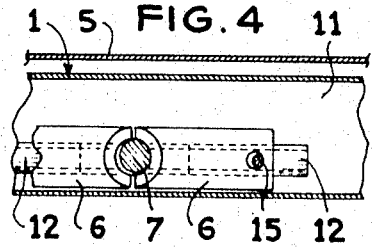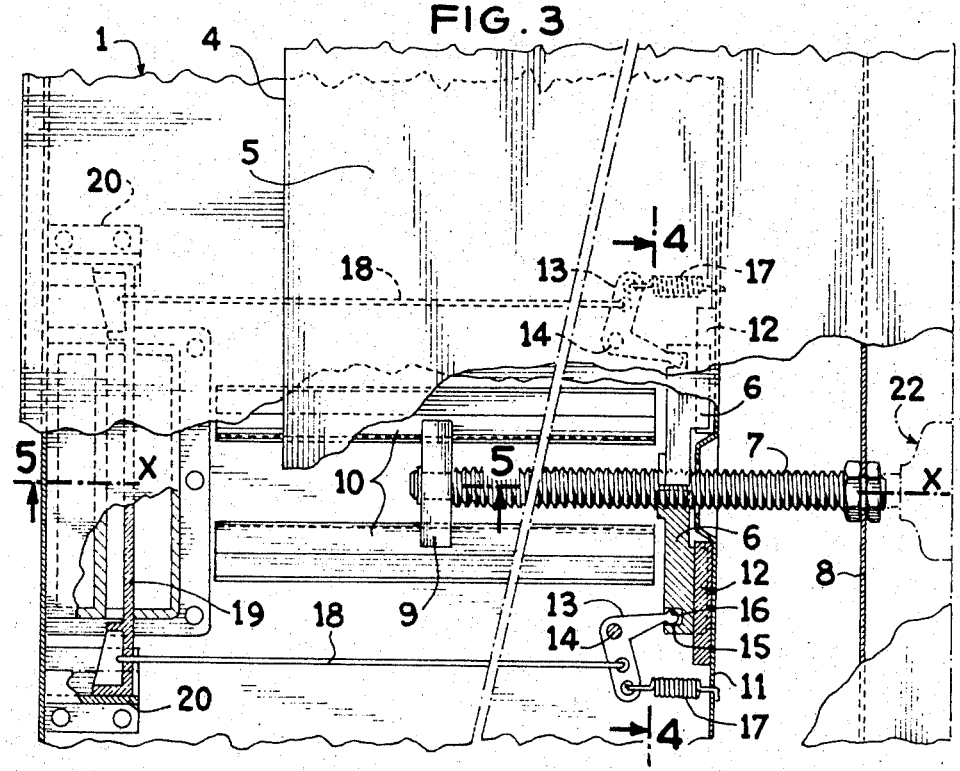

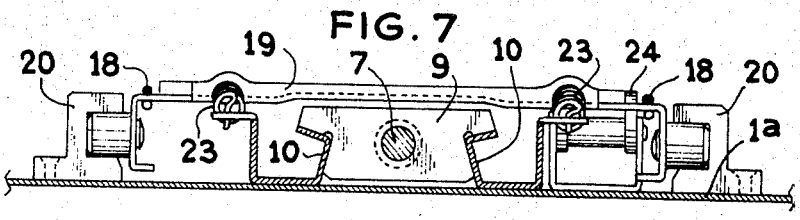
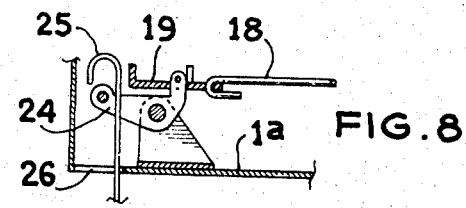
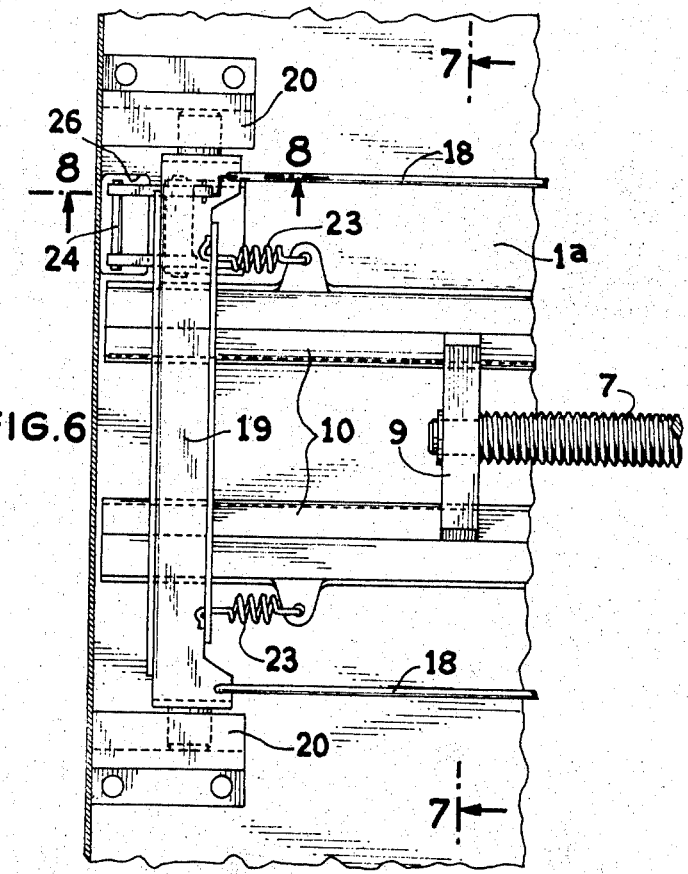

SLIDING ROOF

The present invention relates to sliding roofs which are provided on certain vehicles and in particular certain automobile vehicles.

It is known that these sliding roofs can be actuated manually or electrically and that, in the first case, the moving panel is usually maintained in its partly opened position or fully opened position by the clamping of pads and the slideways which afford the lateral guides for the panel. There is therefore a danger of an appreciable undesired sliding as a result of wear of the pads or insufficient clamping. Less frequently, the panel is held stationary by means of lateral locking mechanisms.

Moreover, electric control mechanisms are known which comprise longitudinally extending screws which are fixed in longitudinal position relative to the roof and which may be driven in rotation, by an electric motor, in a nut integral with the moving panel. In the event of for example a break-down, the shifting of the panel to return it to the closing position is long and awkward, since it is necessary to rotate the screw manually for example with a key having a pawl. This operation even becomes practically impossible if, in order to avoid placing a speed-reducer between the motor and the screw, a sufficiently fine or slow pitch has been provided for the screw and nut.

It should be mentioned that, as is clear from the foregoing preamble, none of the known devices is designed to permit the easy adaptation of either of the two types of control, namely manual or electrical, and this does not permit a standardization of the component parts employed in each of these controls.

An object of the invention is to provide a sliding roof which allows this adaptation and which avoids the aforementioned drawbacks of the manually controlled and electrically controlled devices.

The invention provides a sliding roof for a vehicle comprising a movable panel slidably mounted on a fixed part of the roof or canopy, shifting means for shifting the panel to any given position, and locking means for locking the panel in said position, the locking means comprising a toothed rod integral with the roof and having an axis parallel to the direction of sliding of the panel, two jaws carried by the panel and movable transversely of said direction of sliding, resiliently yieldable return means for biasing said jaws into engagement with the toothed rod, and a manual control means for shifting apart the jaws and disengaging them from the rod.

According to one embodiment, and in the known manner, the shifting means are controlled manually and comprise a simple handle disposed in the front part of the panel. Preferably, the control means of the locking means is incorporated in this handle.

In a second embodiment, the shifting means are electrically controlled and comprise a motor which rotates the toothed rod which is screwthreaded, the locking jaw means comprising a corresponding screwthread and constituting in their closed position a nut which co-operates with the screwthreaded rod for shifting the panel.

Without going into the details of construction, it can be seen that the fact of employing jaw means and a toothed rod as locking means enables these same elements to be employed as a screw and nut device of the electrically controlled panel-shifting means and this permits obtaining a ready adaptation to either manual control or electrical control.

Further features and advantages of the invention will be apparent from the ensuing description with reference to the accompanying drawings.

In the drawings:

FIG. 1 is a diagrammatic longitudinal sectional view of a sliding or openable roof according to the invention;

FIG. 2 is a diagrammatic sectional view taken on line 2—2 of FIG. 1;

FIG. 3 is a plan view, with a part cut away, of the shifting means and locking means according to the invention;

FIG. 4 is a sectional view taken on line 4—4 of FIG. 3;

FIG. 5 is a sectional view taken on line 5—5 of FIG. 3;

FIG. 6 is a partial plan view of a modification;

FIG. 7 is a sectional view taken on line 7—7 of FIG. 6, and

FIG. 8 is a partial sectional view taken on line 8—8 of FIG. 6.

Reference will first be made to the diagrammatic views of FIGS. 1 and 2 to describe briefly a sliding roof according to the invention. This roof comprises a movable panel 1 which is guided in the known manner by rollers which roll along lateral slideways 3. This panel closes to a variable extent an opening 4 formed in the roof or canopy 5 of the vehicle which can be, for example, an automobile vehicle.

The reference numeral 5a (FIG. 1) designates the front edge of this roof.

According to the invention, the device which holds the panel stationary in the selected position comprises two jaws 6 disposed in the rear part of the panel and co-operating with a toothed rod 7 having an axis X—X and connected to the roof, this rod being mounted in a depending flange 8 located in the rear part of the roof. In the presently described embodiment, the rod 7 has a screw thread and carries at its free or front end a block 9 which has a shape shown clearly in FIG. 2 and is adapted to slide along two slideways 10 integral with the panel and extending on each side of the screw 7.

The jaws 6 are mounted on the vertical rear edge portion 11 of the panel (FIGS. 3 and 4) so as to slide in a transverse direction, these jaws being guided by slideways 12 having a dove-tail section and integral with the panel. The jaws 6 are normally maintained in engagement with the rod 7 by two cranked levers 13 which are pivotable on the panel about pins 14, one of the branches of the levers defining a ball portion 15 received in a cavity 16 formed in the corresponding jaw and the other end of the other branch being biased by a tension spring 17.

The mechanism which shifts the two jaws 6 apart comprises two rods 18 which extend in directions parallel to the direction of sliding of the panel and have one end hooked to the lever 13 and the other end hooked to a transverse bar 19 which is slidably mounted in the two guiding slideways 20. As can be seen in FIGS. 3 and 5, the bar 19, which is part of manual control means of the locking and unlocking means, is accessible to the user and mounted in a handle 21 which is employed for shifting the sliding panel.

In the embodiment shown in FIGS. 3, 4 and 5, the device is controlled manually. It can be easily adapted to be actuated electrically as it is possible to rotate the screwthreaded rod 7 by means of an electric motor 22 shown in dot-dash line in FIGS. 1 and 3 and disposed within the thickness of the roof 5.

Such a device operates in the following manner:

The jaws 6 are normally maintained in engagement with the toothed or screwthreaded rod 7 by the action of the springs 17 and the levers 13, and the panel is locked in position with respect to the fixed part of the roof. If it is desired to shift this panel manually, it is sufficient to exert a pressure on the bar 19 as shown in FIG. 5 so as to pull on the rods 18 and shift apart the jaws 6 and consequently disconnect the panel from the fixed part of the roof. 32

The sliding panel can then be brought to the desired new position, the locking being effected simply by releasing the bar 19 which results in the jaws 6 returning to a position of engagement with the rod 7.

In the case of an electrically controlled device, in order to shift the panel, it is sufficient to supply the motor 22 with power to rotate the screw in the chosen direction and shift the panel by means of co-operation, in the known manner, between the screw and the nut constituted by the two jaws 6. In the event of breakdown of the electrical device, it is sufficient to employ the manual control as explained hereinbefore, for example to return the panel to a fully closed position.

However, if it is desired to improve the appearance of the device in the case of an electrical control, the shifting handle 21 can be eliminated as shown in FIGS. 6, 7 and 8. In this embodiment, the bar 19, which is moreover biased by additional springs 23, can be shifted by means of a small lever 24 pivoted to the panel (FIG. 8), this lever being shifted for example by means of a hook 25 which extends through an opening 26 formed in the lower wall of the sliding panel. It can be seen that, in this case, the lower face 1a of the panel is practically continuous, merely a very small opening being necessary in the region of the lever 24 to allow the passage of the hook 25 and render the manual control means comprising the bar 19 accessible to the user.

It will be clear from the foregoing description that, although simple in construction, the device allows an easy adaptation to manual control and automatic control and moreover avoids the drawbacks of devices controlled by a screw and nut arrangement, in which, in the event of breakdown of the electric motor, the screw must be rotated manually to bring the panel to the chosen position.

Having now described my invention what I claim as new and desire to secure by Letters Patent is:

1. An openable roof of a vehicle comprising a fixed part defining an opening; a slidable panel slidably mounted on the fixed part for selectively opening and closing said opening; shifting means for sliding the panel to any position in a given direction longitudinally of said opening; and locking means for locking the panel in said position, the locking means comprising a longitudinally extending toothed rod having an axis parallel to said given direction and axially in fixed relation to the fixed part of the roof, the toothed rod having teeth in spaced relation axially of the rod; two jaws carried by the panel and movable relative to the panel transversely of said given direction, resiliently yieldable return means for biasing said jaws toward each other and into engagement with the teeth of the toothed rod, manual control means for shifting apart the jaws and disengaging them from the teeth of the toothed rod, guide means parallel to the axis of the toothed rod and carried by the panel, and a member carried by rod and movably supported on said guide means to guide the toothed rod when sliding the panel.

2. An openable roof as claimed in claim 1, wherein the panel is in the form of a box structure and comprises a rear upstanding transverse wall on which wall the jaws are guidedly mounted.

3. An openable roof as claimed in claim 2, comprising dove-tail section slideways mounted on the transverse wall for guiding the jaws relative to the panel.

4. An openable roof as claimed in claim 1, comprising a handle carried by the panel for manually applying a force to the handle for shifting the panel, the manual control means comprising a shifting member incorporated in the handle.

5. An openable roof of a vehicle comprising a fixed part defining an opening having transversely spaced longitudinally extending sides; a slidable panel slidably mounted on the fixed part for selectively opening and closing said opening; shifting means for sliding the panel to any position in a given direction longitudinally of said opening; and locking means for locking the panel in said position, the locking means comprising a longitudinally extending toothed member having an axis parallel to said given direction and axially in fixed relation to the fixed part of the roof and located intermediate said longitudinally extending sides, the toothed member having teeth in spaced relation axially of the member, two jaws carried by the panel and movable relative to the panel transversely of said given direction, resiliently yieldable return means for biasing said jaws toward each other and into engagement with the teeth of the toothed member, manual control means for shifting apart the jaws and disengaging them from the teeth of the toothed member, the manual control means comprising a shifting member mounted in the vicinity of the front end of the panel, a rod extending rearwardly from the shifting member and a cranked lever rotatably mounted on the panel and having a first branch connected to a jaw and a second branch hooked to the rod.

6. An openable roof as claimed in claim 5, wherein the resiliently yieldable return means biasing each jaw into engagement with the rod is hooked between the second branch of the lever and the rear wall of the panel.

7. An openable roof as claimed in claim 6, wherein said shifting member is a bar mounted in the panel to be slidable in said given direction, an identical assembly being provided for each jaw and comprising a rod, a lever, a spring for each jaw, said two assemblies being disposed on each side of the toothed member.

8. An openable roof of a vehicle comprising a fixed part defining an opening; a slidable panel mounted to slide on the fixed part of the roof in a direction longitudinally of the opening for selectively opening and closing said opening; shifting means for sliding the panel to any position in said direction and comprising a screwthreaded rod mounted on said fixed part of the roof to rotate about an axis parallel to said direction and to be axially stationary relative to said fixed part of the roof, and nut means mounted on the panel to be in a fixed position on the panel axially of the rod but movable relative to the panel radially of said axis out of and into engagement with the screw thread of the rod so that when the nut means engage with the rod rotation of the rod causes the nut means and panel to move axially of the rod; guide means carried by the panel and in co-operating relation to the screwthreaded rod for maintaining the screwthreaded rod paralled to said direction; manual control means accessible to the user and combined with the nut means to move the nut means selectively out of and into engagement with the rod, the manual control means in combination with the nut means having for function to enable the user to release the nut means from the rod for shifting the panel to said position by shifting means other than said screwthreaded rod and thereafter to lock the panel in said position by engagement of the nut means with the rod.

9. An openable roof as claimed in claim 8, wherein the shifting means are electrical and comprise an electric motor which is connected to rotate the screwthreaded rod.

10. An openable roof as claimed in claim 8 wherein the nut means comprise jaws mounted on the panel to be movable radially of the rod into and out of engagement with the rod, at least one of the jaws having a portion which is engageable with the screwthread of the rod to be driven axially of the rod when the jaws are in engagement with the rod and the rod is rotated.

11. An openable roof as claimed in claim 10, wherein the control means comprise a bar slidably mounted on the panel, means operatively connecting the bar to the jaws so that sliding of the bar in one direction causes the jaws to spread apart and sliding of the bar in the opposite direction causes the jaws to move into engagement with said screwthreaded rod, and an element movably mounted on the panel and operatively combined with the bar for sliding the bar and spreading the jaws apart upon movement of said element, an aperture being provided in the slidable panel for the passage of a tool for engaging and shifting the movable element and sliding the bar.

12. An openable roof as claimed in claim 8, wherein said opening has transversely spaced longitudinally extending sides and the axis of rotation of the rod is located substantially mid-way between the longitudinally extending sides.

13. An openable roof of a vehicle comprising a fixed part defining an opening; a slidable panel slidably mounted on the fixed part for selectively opening and closing said opening; shifting means for sliding the panel to any position in a given direction longitudinally of said opening; and locking means for locking the panel in said position, the locking means comprising a longitudinally extending toothed member having an axis parallel to said given direction and axially in fixed relation to the fixed part of the roof, the toothed member having teeth in spaced relation axially of the member, toothed means carried by the panel and movable transversely of the toothed member into and out of toothed engagement with the toothed member, manual control means accessible to the user and combined with the toothed means for selectively shifting the toothed means into and out of engagement with the teeth of the toothed member; guide means extending longitudinally of the direction of movement, disposed centrally with respect to and carried by the panel and co-operating with the toothed member for maintaining the toothed member parallel to said direction.

* * * * *